United States Patent
Petermeier

(10) Patent No.: US 6,497,930 B1
(45) Date of Patent: Dec. 24, 2002

(54) PROCESS FOR RECYCLING ASPHALT SHINGLES AND PRODUCT PRODUCED THEREBY

(76) Inventor: Gerald D. Petermeier, 506 E. 2nd St., Vinton, IA (US) 52349

( * ) Notice: Subject to any disclaimer, the term of this patent is extended or adjusted under 35 U.S.C. 154(b) by 0 days.

(21) Appl. No.: 09/681,460

(22) Filed: Apr. 11, 2001

(51) Int. Cl.[7] .......................... B29B 17/00; B02C 19/12
(52) U.S. Cl. ........................... 428/2; 264/120; 264/911; 264/920; 428/332
(58) Field of Search ................................ 264/109, 120, 264/911, 920, 118, 125, 126; 428/2, 332; 241/23

(56) References Cited

U.S. PATENT DOCUMENTS 5,385,426 A * 1/1995 Omann
5,938,130 A * 8/1999 Zickell
6,039,914 A * 3/2000 Gehrice et al. ............. 264/911

* cited by examiner

Primary Examiner—Mathieu D. Vargot
(74) Attorney, Agent, or Firm—James C. Nemmers

(57) ABSTRACT

A process and the product produced by the process in which recycled asphalt shingles are reduced into granules which are then heated to a temperature above 212° F. in order to evaporate any water contained in the material. Once substantially all the water has been evaporated, the heated granules are then placed in a suitable mold and compressed under high pressure to form a block of the desired size and shape after which the blocks are removed from the mold and used on low-traffic volume areas such as patios, sidewalks, driveways, etc.

18 Claims, No Drawings

PROCESS FOR RECYCLING ASPHALT SHINGLES AND PRODUCT PRODUCED THEREBY

BACKGROUND OF INVENTION

There are a number of asphalt based products commercially used especially for roofing materials such as roofing shingles. These roofing materials have a limited life, and although under proper circumstances a new layer of material can be laid over an existing layer, at some point the shingles must be removed and properly disposed of as waste. Typically, the old roofing materials are disposed of in a landfill and therefore present environmental problems.

Although there are known processes for recycling these roofing materials, the composition of them can present environmental concerns and processing complications. For example, attempts have been made to recycle asphalt roofing material through rather expensive and complex processes using a considerable amount of equipment and in which liquid asphalt is added. A number of the known processes produce a liquid product. Richards U.S. Pat. No. 5,367,007 teaches a process which uses recycled asphalt shingles that requires the addition of material to produce a multi-layer paving block containing thermoplastic materials. There is however, not known any simple process in which recycled roofing materials can be used to produce blocks at a cost where they can be commercially used in various applications for paving, walkways, etc.

It is therefore an object of the invention to make a useful product from a normally discarded material such as asphalt roofing material. It is a further object of the invention to produce a unique and simple process that can economically produce asphalt blocks made from recycled materials that can be used on patios, sidewalks, or for paving of driveways and roadways that have low traffic volume.

SUMMARY OF INVENTION

The invention is for a process and the product produced by the process in which recycled asphalt shingles are reduced into granules in any suitable manner. The granules are then heated to a temperature above 212° F. in order to evaporate any water contained in the material. Once substantially all the water has been evaporated, the heated granules are then placed in a suitable mold and compressed under high pressure to form a block of the desired size and shape after which the blocks are removed from the mold.

DETAILED DESCRIPTION

Ordinarily, when asphalt shingles are removed from a roof, the product has wood mixed in with the shingles, and the wood content may be as high as 15%. Most roofing contractors are not particularly careful in removing the shingles before installing a new roof, and the wood must be separated from the asphalt shingles by first running the mixture through a tank of water. The shingles will sink to the bottom of the tank and the wood will float at the top, thus providing for easy separation.

Because of environmental regulations, asphalt shingles that have been discarded must first be tested for asbestos content. Depending upon the regulatory agency involved, different test standards may be applicable, but typically, a relatively small sample of each different shingle from each roof from which the shingle was removed can be tested for asbestos. Typically, the sample of the shingle must be tested and certified by an independent testing agency, and if the asbestos content is below acceptable levels, the shingles can then be used in the process of the invention.

The shingles are then ground and passed through screens to separate particles of varying sizes. The following table shows the results of two test runs. The table shows the percentage passing through the screen sizes listed in the table.

| Size | 1" | ¾" | ½" | ⅜" | #4 | #8 | #16 | #30 | #50 | #100 | #200 | Pan |
|---|---|---|---|---|---|---|---|---|---|---|---|---|
| Sample 1 | 99.8 | 98.7 | 83.7 | 71.5 | 52.4 | 44.9 | 24.2 | 10.4 | 4.3 | 1.9 | 0.9 | 0.0 |
| Sample 2 | 100.0 | 99.0 | 85.0 | 72.6 | 50.7 | 41.5 | 18.1 | 6.8 | 2.8 | 1.3 | 0.6 | 0.0 |

Screens which pass material of a larger size than 1" are generally not recommended. The preferred size is a screen that will allow 1" material to pass. However, as the screen size reduces, the cost of grinding the material into the smaller sizes increases substantially. The gradation of the material as indicated in the foregoing table is acceptable for the most efficient processing according to the invention.

After the asphalt shingles are reduced to a size preferably of 1" or less by grinding or by any other suitable method, the shingles particles are then heated. The heating process should be conducted so that the particles of the various sizes do not segregate. Heating the material in a rotating drum is a preferred way of heating the material and preventing segregation. The temperature of the material when it exits the rotating heated drum should be in the range of 215° F. to 275° F. The most preferred temperature is approximately 220° F. It is however absolutely necessary for the process of the invention that the material be thoroughly heated to a temperature greater than 212° F. in order to evaporate all the water. If the material is heated within the range of 215° to 275°, the durability of the final product according to the Marshall Stability Test (ASTM D1559) will be within an acceptable range. Heating of the material above 275° will produce an acceptable sample, but the cost of heating the material to a temperature above 275° will increase the cost of the ultimate product to the point where it may not be commercially acceptable. An acceptable range of durability according to the Marshall Stability Test is greater than 1500 at a flow of less than 12.

After the heated material exits the rotating drum, it is promptly introduced into a form of the desired size and shape. Size and shape will depend upon the use intended for the final product. The blocks are suitable for paving walks, driveways, or any other use where a hard surface is desired.

The mold may be such that the blocks can be made in varying thicknesses depending upon the particular application. For example, the blocks might be suitable for vehicular traffic where traffic volumes are not high or can be used on cart paths on golf courses. The shape of the mold will depend upon the use, and the molds can be such that the final product can be produced in varying decorative shapes for use on patios.

The heated asphalt particles may be dropped into a container and weighed and then discharged in predetermined weights into the mold. In any event, the weighing container should be maintained at the exit temperature of the material from the rotating drum.

In addition, the mold should be heated. The mold temperature creates a desired shade of black on the exterior of the final product, and therefore the temperature of the form will vary in a range of 225° to 275° F. For example, if the exit temperature of the material from the drum is 220°, preferably, the temperature of the mold would be 240°. Thus, the exit temperature from the heated drum and the temperature of the mold should be determined within the acceptable ranges specified herein to produce a final product of the desired appearance.

The mold into which the heated material is placed preferably should be lined with a suitable low friction material to prevent the material adhering to the mold and making removal difficult.

Once the heated material is placed into the heated mold, pressure is applied to the material in the mold in any suitable manner. The pressure applied should be in the range of 300 psi to 760 psi. This pressure range is necessary in order to produce a final product having a density of 95 lbs. per cubic foot. It has been determined that applying pressure within the foregoing range will assure a final product of at least the desired density.

The pressure applied to the product in the mold is also necessary because of the varying size of the particles that form the product. The pressure will also vary depending upon the temperature of the product in the mold. Generally, the lower the temperature of the product in the mold, the higher the amount of pressure that must be applied to achieve the desired density of the final product. For example, if the exit temperature of the product from the heated drum is 220° F. and the mold temperature is 240° F., a pressure of 630 psi is suitable to produce a density of 95 lbs. per cubic foot for a product of a final thickness of 2" to 2.25". On the other hand, if the temperature of the material exiting the heated drum is 240° F. and the mold temperature is 240° F., and the desired final thickness is 1.75", a pressure of 510 psi will produce a product of the desired minimum density.

After the product has been compressed to the desired thickness, the product can be removed from the mold and cooled. Cooling can be achieved rapidly by well known methods or the product can merely be stored and cooled to room temperature gradually.

If the material to be recycled is roofing shingles and they contain numerous nails, the nails preferably should first be removed. It is desirable that that amount of nails in the material to be recycled be less than 1% of the product by weight. Commercially available grinders are available which are equipped with magnets in order to remove the nails as the shingles are being ground into particles. Even though a few nails may escape removal, they can be formed into the final product without detriment to the quality of the final product.

From the foregoing description, it is evident that the process of the invention is a simple and relatively inexpensive process that will allow discarded materials such as asphalt roofing shingles to be economically recycled into a useful product. Typically, roofing contractors will dispose of shingles at a local landfill and be required to pay a fee based upon weight at the disposal site. A typical fee is approximately $40 per ton. If a processing site can be set up for recycling the discarded shingles into a useful product, most contractors would obviously prefer to dispose of the shingles at such a processing facility and save the disposal fee. The process of the invention thus can be operated on a small or even large scale resulting in a very useful product that can be sold on the commercial marketplace at a profit for numerous suitable uses in walks, driveways, golf cart paths, patios, etc. With present day concerns about the environment, the process of the invention will be welcomed by environmentalists.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A process for producing blocks from recycled asphalt roofing materials, said process comprising: reducing the roofing materials to discrete particles; heating the particles in a manner so as to prevent segregation of particles of different sizes and to thoroughly heat all the particles to a temperature greater than 212° F. to evaporate substantially all the water contained in the particles; introducing the heated particles into a mold of the desired final product configuration promptly after heating; applying sufficient pressure to the particles while in the mold and at about the heated temperature to bind the particles together into a solid product; and removing the product from the mold.

2. The process of claim 1 in which the particles are heated to a temperature in the range of 215° to 275° F.

3. The process of claim 2 in which the mold is heated.

4. The process of claim 3 in which the temperature of the mold is greater than the temperature of the particles just prior to introduction of the particles into the mold.

5. The process of claim 4 in which the pressure applied to the particles while in the mold is sufficiently high to produce a final product having a density of approximately 95 lbs/ft$^3$.

6. The process of claim 5 in which the pressure applied to the particles while in the mold is in the range of 300 to 760 psi.

7. The process of claim 6 in which the particle size is 1" or less.

8. The process of claim 7 in which the interior surface of the mold contacted by the particles is a low friction surface.

9. The process of claim 8 in which the heating of the particles is conducted in a rotating drum so as to minimize segregation of the particles.

10. An asphalt block formed from recycled asphalt roofing materials that have been reduced to discrete particles, the particles having been heated in a manner so as to prevent segregation of particles of different sizes and to thoroughly heat all the particles to a temperature greater than 212° F. to evaporate substantially all the water contained in the particles and then introduced into a mold of the desired final block configuration, the particles having had sufficient pressure applied to them while at about the heated temperature in the mold to bind the particles together into a solid block.

11. The asphalt block of claim 10 in which the particles were heated to a temperature in the range of 215 to 275° F.

12. The asphalt block of claim 11 in which the mold was heated at the time the particles were introduced into the mold.

13. The asphalt block of claim 12 in which the temperature of the mold at the time the particles were introduced into the mold was greater than the temperature of the particles just prior to introduction of the particles into the mold.

14. The asphalt block of claim 13 in which the pressure applied to the particles while in the mold was sufficiently high to produce a final asphalt block having a density of approximately 95 lbs/ft$^3$.

15. The asphalt block of claim 14 in which the pressure applied to the particles while in the mold was in the range of 300 to 760 psi.

16. The asphalt block of claim 15 in which the particle size is 1" or less.

17. The asphalt block of claim 16 in which the interior surface of the mold contacted by the particles is a low friction surface.

18. The asphalt block of claim 17 in which the heating of the particles forming the block was conducted in a rotating drum so as to minimize segregation of the particles.

* * * * *